US006879968B1

(12) United States Patent
Hayakawa et al.

(10) Patent No.: US 6,879,968 B1
(45) Date of Patent: Apr. 12, 2005

(54) SPEAKER VERIFICATION APPARATUS AND METHOD UTILIZING VOICE INFORMATION OF A REGISTERED SPEAKER WITH EXTRACTED FEATURE PARAMETER AND CALCULATED VERIFICATION DISTANCE TO DETERMINE A MATCH OF AN INPUT VOICE WITH THAT OF A REGISTERED SPEAKER

(75) Inventors: Shoji Hayakawa, Kanagawa (JP); Fumitada Itakura, Aichi (JP); Kazuya Takeda, Aichi (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/487,467

(22) Filed: Jan. 19, 2000

(30) Foreign Application Priority Data

Jan. 4, 1999 (JP) .......................................... 11-094734

(51) Int. Cl.[7] .............................................. G06F 15/18
(52) U.S. Cl. .......................................... 706/20; 706/15
(58) Field of Search .............................. 706/20, 21, 22, 706/15

(56) References Cited

U.S. PATENT DOCUMENTS

| 4,292,471 A | * | 9/1981 | Kuhn et al. ................ 704/238 |
| 4,363,102 A | * | 12/1982 | Holmgren et al. .......... 704/238 |
| 4,837,830 A | * | 6/1989 | Wrench et al. ............. 704/238 |
| 5,121,428 A | * | 6/1992 | Uchiyama et al. .......... 704/243 |
| 5,271,088 A | * | 12/1993 | Bahler ....................... 704/200 |
| 5,339,385 A | * | 8/1994 | Higgins ...................... 704/246 |
| 5,461,697 A | * | 10/1995 | Nishimura et al. ......... 704/232 |
| 6,006,184 A | * | 12/1999 | Yamada et al. ............. 704/246 |
| 6,593,956 B1 | * | 7/2003 | Potts et al. ............. 348/14.09 |

FOREIGN PATENT DOCUMENTS

JP  8-123475  5/1996  ............. G10L/3/00

OTHER PUBLICATIONS

Furui, "Cepstral Analysis Technique for Automatic Speaker Verification", IEEE Transactions on Acoustics, Speech and Signal Processing, Apr. 1981, vol. 29, No. 2.*
Hayakawa et al., "The Influence of Noise on the Speaker Recognition Performance Using the Higher Frequency Band", 1995 International Conference on Acoustics, Speech and Signal Processing, May 1995, vol. 1, pp. 321–324.*
Hayakawa et al., "Text–Dependent Speaker Recognition Using the Information in the Higher Frequency Band", 1994 International Conference on Acoustics, Speech and Signal Processing, Apr. 1994, vol. 1, pp. I/370–I/140.*
Itakura, F., "Minimum Prediction Residual Principle Applied to Speech Recognition", IEEE Transactions on Acoustics, Speech and Signal Processing, Feb. 1975, vol. ASSP–23, No. 1.*
Itakura, et al., "Distance Measure for Speech Recognition Based on the Smoothed Group Delay Spectrum", IEEE International Conference on ICASSP '87, Apr. 1987, vol. 12, pp. 1257–1260.*

(Continued)

*Primary Examiner*—Anthony Knight
*Assistant Examiner*—Kelvin Booker
(74) *Attorney, Agent, or Firm*—Staas & Halsey LLP

(57) ABSTRACT

A speaker verification apparatus and method input an identity claim, select voice information of a registered speaker corresponding to the input identity claim, input a voice of the speaker, analyze the input voice so as to extract a feature parameter, calculate a verification distance between a feature parameter of the input voice and that of the voice of the registered speaker and the speaker distances between a feature parameter of the input voice and those of the voices of other speakers; and determine whether or not the input voice matches that of the registered speaker. A false acceptance error rate, is input as a threshold, and a probability distribution of interspeaker distances is functions to determine that the input voice is the voice of the registered person specified by the identity claim.

18 Claims, 12 Drawing Sheets

OTHER PUBLICATIONS

Kajita et al., "Spectral Weighting of SBCOR for Noise Robust Speech Recognition", Proceedings of the 1998 IEEE Internationa Conference on Acoustics, Speech and Signal Processing, May 1998, vol. 2, pp. 621–624.*

Kajita et al., "Subband–Autocorrelation Analysis and Its Application for Speech Recognition", 1994 IEEE International Conference on Acoustics, Speech and Signal Processing, Apr. 1994, vol. 2, pp. II/193–II/196.*

* cited by examiner

SPEAKER VERIFICATION APPARATUS AND METHOD UTILIZING VOICE INFORMATION OF A REGISTERED SPEAKER WITH EXTRACTED FEATURE PARAMETER AND CALCULATED VERIFICATION DISTANCE TO DETERMINE A MATCH OF AN INPUT VOICE WITH THAT OF A REGISTERED SPEAKER

BACKGROUND OF THE INVENTION

1. Field of the Invention

The present invention relates to a speaker verification apparatus and method for determining by the voice of the speaker whether or not the speaker is an authorized user based on the feature parameters of the voices that are previously registered.

2. Description of the Prior Art

In recent years, with the development of computer technologies, a communication environment has been developed rapidly. With the development of such a communication environment, computer telephony integration through the telephone has become common in ordinary homes.

In the field of such computer telephony integration through the telephone, a problem may arise when accessing information that should not be known to people other than the authorized person or a specific group of authorized people, such as private information or information subjected to secrecy obligation. More specifically, for example, when a push-button telephone is used, it is possible to acquire an access authority to information by inputting a password by an operation of pushing buttons of the telephone. However, when the password is known to unauthorized people, they can access the information easily although they are not duly authorized. For this reason, there is a need of verifying whether or not the person who tries to access the information is the duly authorized person or one of a specific group of authorized people using the voice, which is inherent to the individual. In order to ensure such a security function, it is important that the registration of voices for verification or the determination of the threshold for judging whether or not the input voice is the voice of an authorized person does not cause an excessive burden to the user.

Conventionally in general, a fixed and predetermined value has been used as a threshold for determining whether or not the speaker is an authorized person. More specifically, as shown in FIG. 1, a verification distance between an input voice and a previously registered voice is calculated and compared to a predetermined threshold. When the verification distance is equal to or shorter than the predetermined threshold ("−" in FIG. 1), it is determined that the speaker is an authorized person. When the verification distance is longer than the predetermined threshold ("+" in FIG. 1), it is determined that the speaker is an unauthorized person.

It is desirable that such a threshold is set to a value as described below. In FIG. 2, FR (false rejection error rate), which is a probability of the case where the determination that the speaker should be rejected as an unauthorized person is erroneous, is plotted in the vertical axis against the threshold of the verification distance in the horizontal axis. Similarly, FA (false acceptance error rate), which is a probability of the case where an unauthorized person is erroneously accepted, is plotted in the vertical axis against the threshold of the verification distance in the horizontal axis. When the threshold is a small value, the rate FA of erroneous acceptance of an unauthorized person is low, whereas the rate FR of erroneous rejection of an authorized person is high. On the other hand, when the threshold is a large value, the rate FR of erroneous rejection of an authorized person is low, whereas the rate FA of erroneous acceptance of an unauthorized person is high. Therefore, it is desirable to set the threshold to be an appropriate value depending on the level of importance of the two error rates. It is general to perform verification using a value that allows the two error rates to be eventually equal experimentally as the threshold.

However, in the above-described method, it is necessary to be aware of the tendency of the false rejection error rate FR and the false acceptance error rate FA beforehand to set the threshold. However, it is difficult to know the two error rates before being used. Therefore, a preliminary experiment is performed to seek an approximate value, or the threshold is updated whenever it is required at the time of using the system. The method of performing a preliminary experiment is disadvantageous for the following reasons. Because of the difference in the conditions between when the preliminary experiment is performed and when the system is actually used, it is often necessary to perform a test again when using the system. In addition, in order to obtain the false rejection error rate FR, it is necessary for an authorized person (user) to give his/her voice many times, which causes a large burden to the user and is unpractical. On the other hand, the method of updating the threshold whenever it is required at the time of using the system is disadvantageous because updating the threshold causes a large burden to the user as well.

Furthermore, the voice of an authorized person can change over time, and in general, accurate identification of the speaker is difficult when noise such as background sound is mixed therewith.

SUMMARY OF THE INVENTION

Therefore, with the foregoing in mind, it is an object of the present invention to provide a speaker verification apparatus and method whose implementation environment can be set without an excessive burden to a user and that can specify the speaker in a high accuracy.

A speaker verification apparatus of the present invention includes an identity claim input part to which an identity claim is input; a speaker selecting part for selecting the voice information of the registered speaker corresponding to the identity claim input to the identity claim input part; a speaker storing part for storing voice information of speakers; a voice input part to which a voice of a speaker is input; a voice analyzing part for analyzing the voice input to the voice input part; a speaker distance calculating part for calculating a verification distance between a feature parameter of the input voice and that of the voice of the registered speaker and the speaker distances between a feature parameter of the input voice and those of the voices of speakers other than the registered speaker that are stored in the speaker sorting part, based on the analysis results of the voice analyzing part and the voice information stored in the speaker storing part; and a speaker judging part for determining whether or not the input voice matches the registered speaker corresponding to the input identity claim. The speaker verification apparatus further includes a false acceptance error rate input part to which a false acceptance error rate is input as a threshold, the false acceptance error rate being predetermined by a system manager or a user or adjustable depending on the performance, and a distribution estimating part for obtaining a probability distribution of interspeaker distances based on the speaker distances calculated in the speaker distance calculating part. The speaker judging part determines that the input voice is the voice of the person specified by the identity claim, in the case where the verification distance calculated in the speaker distance calculating part is included in a region defined by the input false acceptance error rate in the probability distribution of the interspeaker distances. Herein, "interspeaker distances" means a distance with a speaker template that is not the template of the person specified by the identity claim.

In this embodiment, a fixed threshold of a verification distance is not used, but a probability of the interspeaker distances is calculated each time a system is used, and a threshold is determined based on the false acceptance error rate in the distribution of the interspeaker distances. Therefore, a criterion for judging the speaker closer to the theoretical values of a statistical probability distribution can be obtained. In addition, the false acceptance error rate can be maintained closer to the theoretical values even if the voice input environment changes and a noise is mixed. Thus, the verification accuracy of the speaker verification can be maintained high without being affected by the aging of the input voice. The present invention is based on the empirical fact that although the speaker distance itself constantly changes by external factors such as the difference in the environment where a voice is input and the aging of the voice, the relationship with respect to the interspeaker distances between the input voice and the other registered speakers hardly changes.

Another aspect of the present invention is software that executes the functions of the above-described speaker verification apparatus. More specifically, the present invention is directed to a computer-readable recording medium on which the method for verifying a speaker or steps of the method are recorded as a program. The method includes inputting an identity claim; selecting voice information of a registered speaker corresponding to the input identity claim; inputting a voice of the speaker; analyzing the input voice; calculating a verification distance between the input voice and the voice of the registered speaker and the speaker distances between the input voice and voices of registered speakers other than the registered speaker, based on the analysis results and the voice; and determining whether or not the input voice matches the registered speaker corresponding to the input identity claim. The method further includes inputting a false acceptance error rate as a threshold, the false acceptance error rate being predetermined by a system manager or a user or adjustable depending on the performance; and obtaining a probability distribution of the interspeaker distances based on the calculated speaker distances. It is determined that the input voice is the voice of the person specified by the identity claim, in the case where the calculated verification distance is included in a region defined by the input false acceptance error rate in the probability distribution of the interspeaker distances.

This embodiment can realize a speaker verification apparatus as described below by loading the program onto a computer and executing the program. A fixed threshold of a verification distance is not used, but a probability distribution of the interspeaker distances is calculated each time a system is used, and a threshold is determined based on the false acceptance error rate in the distribution. Therefore, a criterion for judging the speaker closer to the theoretical values of a statistical probability distribution can be obtained. In addition, the false acceptance error rate can be maintained closer to the theoretical values even if the voice input environment changes and a noise is mixed. Thus, the verification accuracy of the speaker verification can be maintained high without being affected by the aging of the input voice.

These and other advantages of the present invention will become apparent to those skilled in the art upon reading and understanding the following detailed description with reference to the accompanying figures.

DESCRIPTION OF THE PREFERRED EMBODIMENTS

Figure 1:
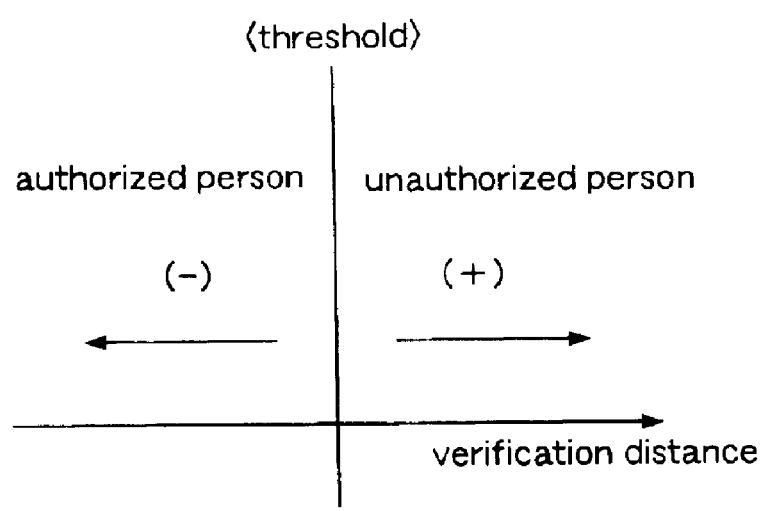
FIG. 1 is a general conceptual diagram of speaker verification.
Figure 2:
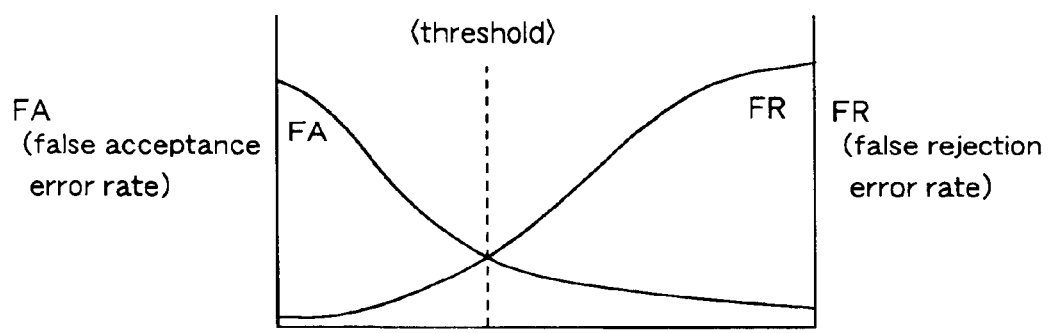
FIG. 2 is a diagram for illustrating a method for specifying a threshold in a conventional speaker verification method.
Figure 3:
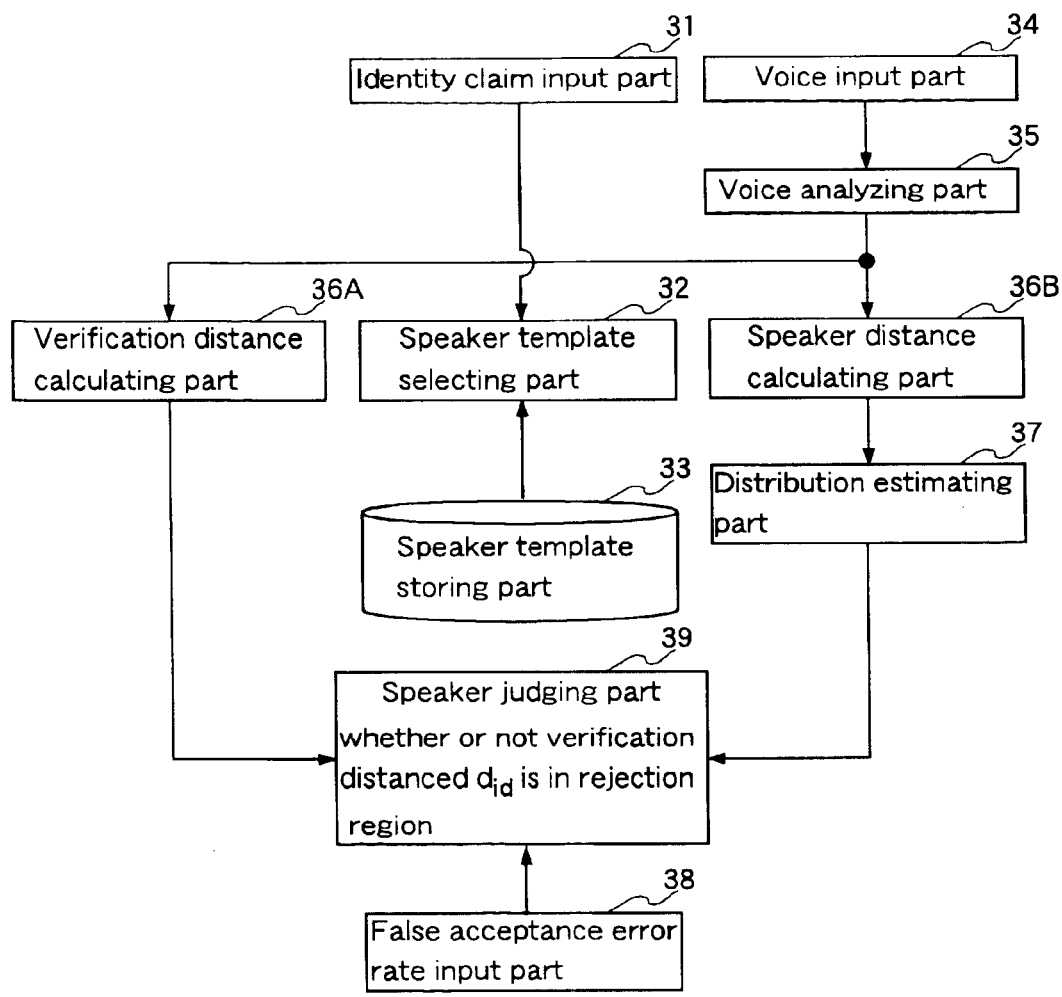
FIG. 3 is a structural block diagram of a speaker verification apparatus of an embodiment of the present invention.

Hereinafter, a speaker verification apparatus of an embodiment of the present invention will be described with reference to the accompanying drawings. FIG. 3 is a structural diagram showing the principle of the speaker verification apparatus of an embodiment of the present invention. Referring to FIG. 3, numeral 31 denotes an identity claim input part. Numeral 32 denotes a speaker template selecting part. Numeral 33 denotes a speaker template storing part. Numeral 34 denotes a voice input part. Numeral 35 denotes a voice analyzing part. Numeral 36A denotes a verification distance calculating part. Numeral 36B denotes a speaker distance calculating part. Numeral 37 denotes a distribution estimating part. Numeral 38 denotes a false acceptance error rate input part. Numeral 39 denotes a speaker judging part.

In FIG. 3, at the time of using a system, an identity claim is input to the ID input part 31. Then, the speaker template selecting part 32 selects a template corresponding to the identity claim from templates of a plurality of speakers that are previously registered in the speaker template storing part 33 and sends the selected template to the verification distance calculating part 36A. At the same time, the templates of the registered speakers other than the speaker corresponding to the identity claim are sent out to the speaker distance calculating part 36B.

Next, in the voice analyzing part 35, a voice input to the voice input part 34 is converted into a feature parameter for speaker verification and sent out to the verification distance calculating part 36A and the speaker distance calculating part 36B. The verification distance calculating part 36A calculates the distance $d_{id}$ between the voice template of the speaker corresponding to the identity claim and the feature parameter of the input voice.

On the other hand, the speaker distance calculating part 36B calculates the distances $d_1, d_2, \ldots$ and $d_N$ between the voice templates of N other registered speakers and the feature parameter of the input voice and delivers the results to the distribution estimating part 37. The distribution estimating part 37 estimates a probability distribution function F(d) of the speaker distances between the voices of the registered speakers other than the speaker corresponding to the input identity claim and the input voice, using the calculated N distances $d_1, d_2, \ldots$ and $d_N$ with respect to the other registered speakers and delivers the result to the speaker judging part 39.

The estimation of the probability distribution function F(d) leads to a probability density function f(d). The area of the function shown in the probability density function f(d) indicates a probability value. The relationship between the probability distribution function F(d) and the probability density function f(d) is that as shown in Equation 1.

Equation 1

$$F(x) = \int_{-\infty}^{x} f(t)dt$$

Therefore, the speaker judging part 39 judges the speaker based on the probability density function f(d) in the following manner. When the speaker distance $d_{id}$ with respect to the speaker corresponding to the identity claim is within the region defined by the level of significance p of regarding an unauthorized person as the person specified by the ID, which is previously designated in the false acceptance error rate input part 38, it is determined that the speaker is the person specified by the ID. When the distance $d_{id}$ is not within the region, it is determined that the speaker is not the person specified by the ID. In the determination based on the probability distribution function F(d), when F($d_{id}$)<p is satisfied, the speaker is the person specified by the ID. When F($d_{id}$)≧p is satisfied, the speaker is not the person specified by the ID.

Figure 4:
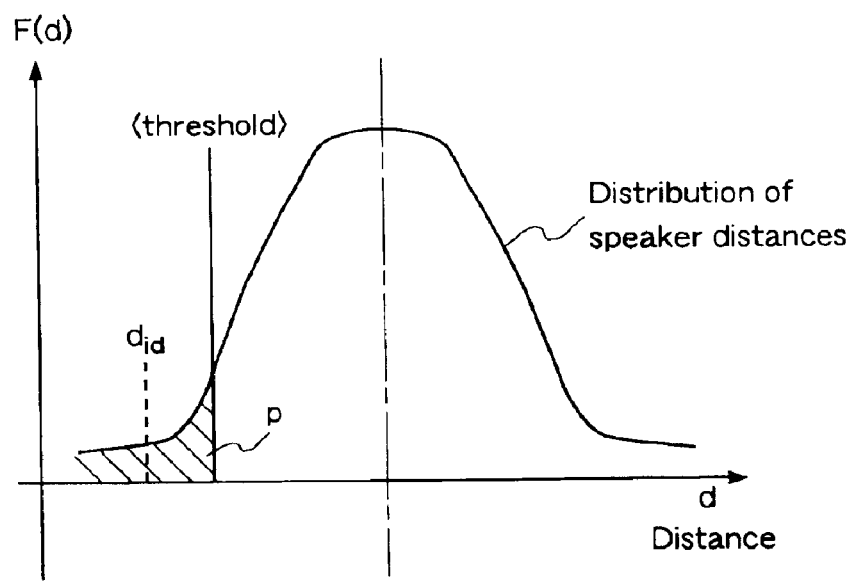
FIG. 4 is a diagram for illustrating a method for specifying a threshold in the speaker verification apparatus of an embodiment of the present invention.

FIG. 4 shows a diagram illustrating the method for judging the speaker by the speaker judging part 39. In the case where the probability density function f(d) is already obtained, the hatched region in the FIG. 4 corresponds to the region defined by the level of significance p of regarding an unauthorized person as the person specified by the ID. More specifically, the level of significance p of regarding an unauthorized person as the person specified by the ID is specified to determine that the speaker is the person specified by the ID when the distance $d_{id}$ is in the range in which the level of significance of regarding an unauthorized person as the person specified by the ID is smaller than the designated level of significance p.

Figure 5:
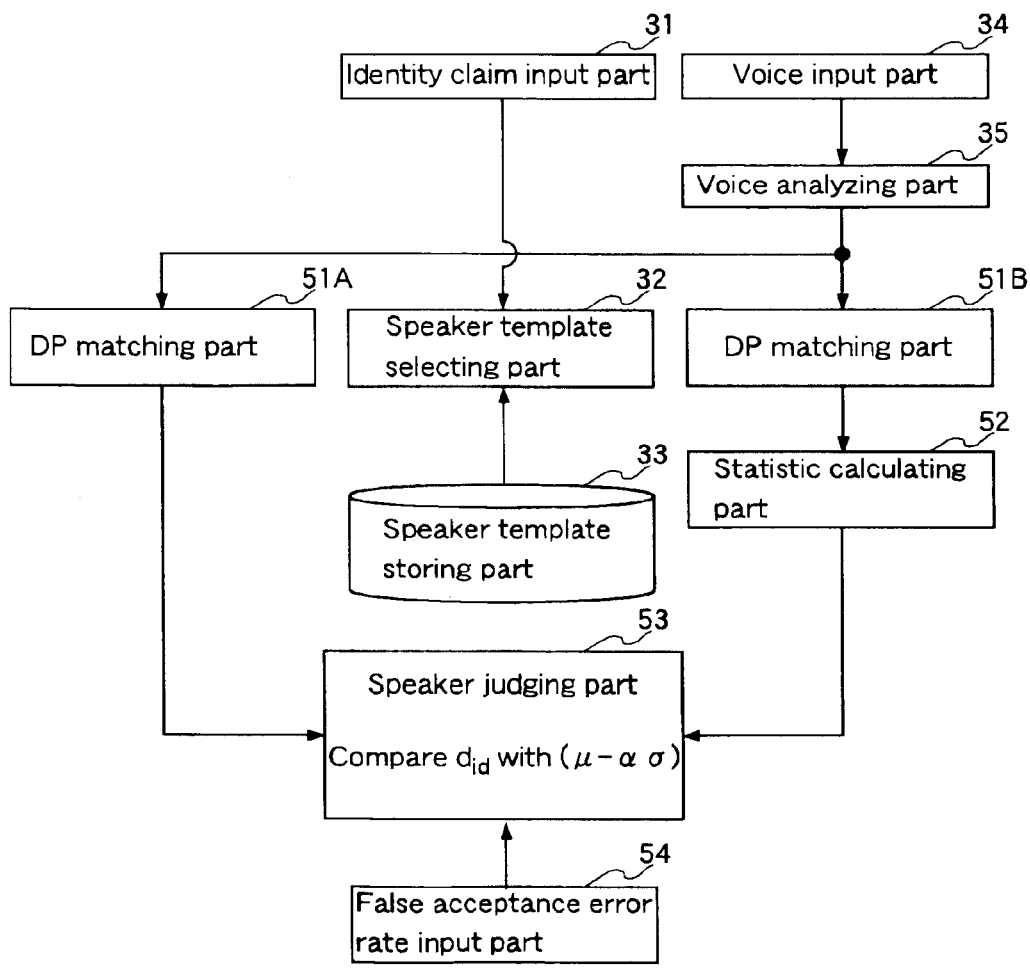
FIG. 5 is a structural block diagram of a speaker verification apparatus of one example of the present invention when verifying the speaker.

Next, FIG. 5 is a block diagram of a speaker verification apparatus of one example of the present invention when verifying the speaker. Referring to FIG. 5, numerals 51A and 51B denote DP matching parts. Numeral 52 denotes a statistic calculating part. Numeral 53 denotes a speaker judging part. Numeral 54 denotes a false acceptance error rate input part.

In FIG. 5, similarly to FIG. 3, an identity claim is input to the ID input part 31 at the time of using a system. Then, the speaker template selecting part 32 selects a template corresponding to the identity claim from templates of a plurality of speakers that are previously registered in the speaker template storing part 33 and sends the selected template to the DP matching part 51A. At the same time, the templates of the registered speakers other than the speaker corresponding to the identity claim are sent out to the DP matching part 51B. Herein, "DP" stands for dynamic programming.

Next, in the voice analyzing part 35, a voice input to the voice input part 34 is converted into a feature parameter for speaker verification and sent out to the DP matching calculating parts 51A and 51B. The DP matching part 51A calculates the distance $d_{id}$ between the voice template of the speaker corresponding to the identity claim and the feature parameter of the input voice.

On the other hand, the DP matching part 51B calculates the distances $d_1, d_2, \ldots$ and $d_N$ between the voice templates of N other registered speakers and the feature parameter of the input voice, and delivers the results to the statistic calculating part 52. The statistic calculating part 52 estimates the average $\mu$ and the standard deviation $\sigma$ of the speaker distances, using the calculated N distances $d_1, d_2, \ldots$ and $d_N$ with respect to the other registered speakers, and delivers the estimations to the speaker judging part 53. The speaker judging part 53 defines a normal distribution using the average $\mu$ and the standard deviation $\sigma$ of the distances with respect to the other registered speakers.

If the probability distribution is a normal distribution, a probability distribution function F(d) in a point $\alpha \cdot \sigma$ away from the average $\mu$ can be determined by $\alpha$. Therefore, whether or not the speaker is the person specified by the ID can be determined by examining whether or not the verification distance $d_{id}$ is in a region where $d_{id}$ is equal to or smaller than ($\mu - \alpha \cdot \sigma$) in order to determine whether or not the verification distance $d_{id}$ with resect to the input voice is within the region defined by the previously designated level of significance p of regarding an unauthorized person as the person specified by the ID. More specifically, ($\mu - \alpha \cdot \sigma$) and $d_{id}$ are compared and the determination is performed as follows. When $d_{id}$ is equal to or smaller than ($\mu - \alpha \cdot \sigma$), it is determined that the speaker is the person specified by the ID. When $d_{id}$ is larger than ($\mu - \alpha \cdot \sigma$), it is determined that the speaker is not the person specified by the ID. In the case where it is assumed that the probability distribution is a normal distribution, the false acceptance error rate input part 54 inputs $\alpha$ corresponding to the level of significance p of regarding an unauthorized person as the person specified by the ID beforehand.

In this embodiment, the feature parameters are registered in the form of templates beforehand, and the probability distribution with respect to other registered speakers is estimated based on the speaker distances obtained by DP matching. The present invention is not limited to this method. For example, the probability distribution can be estimated based on a probability value output from a probability model such as Hidden Markov Model.

Furthermore, in the speaker template storing part 33, speakers may be classified by the gender beforehand. When the speaker corresponding to the identity claim is male, the speaker templates of other male speakers are used for estimation of the probability distribution. When the speaker corresponding to the identity claim is female, the speaker templates of other female speakers are used for estimation of the probability distribution. Thus, the error rate of the probability distribution becomes closer to the error rate obtained from the normal distribution function table. (The identity claim is something which indicates a specific individual such as a name).

Furthermore, in this embodiment, the probability distribution of the speaker distances is estimated as a single normal distribution. However, the probability distribution can be estimated as a mixed normal distribution defined by weighting addition of a plurality of normal distributions or other general probability distributions. (This is not necessarily limited to the distribution of other registered speakers, and other speakers can be prepared for the calculation of the distribution.)

Next, the effects of this embodiment are confirmed by the results of the following experiments. First, FIG. 6 is a graph showing the results of verification of 15 male speakers using the speaker verification method of this embodiment.

Figure 6:
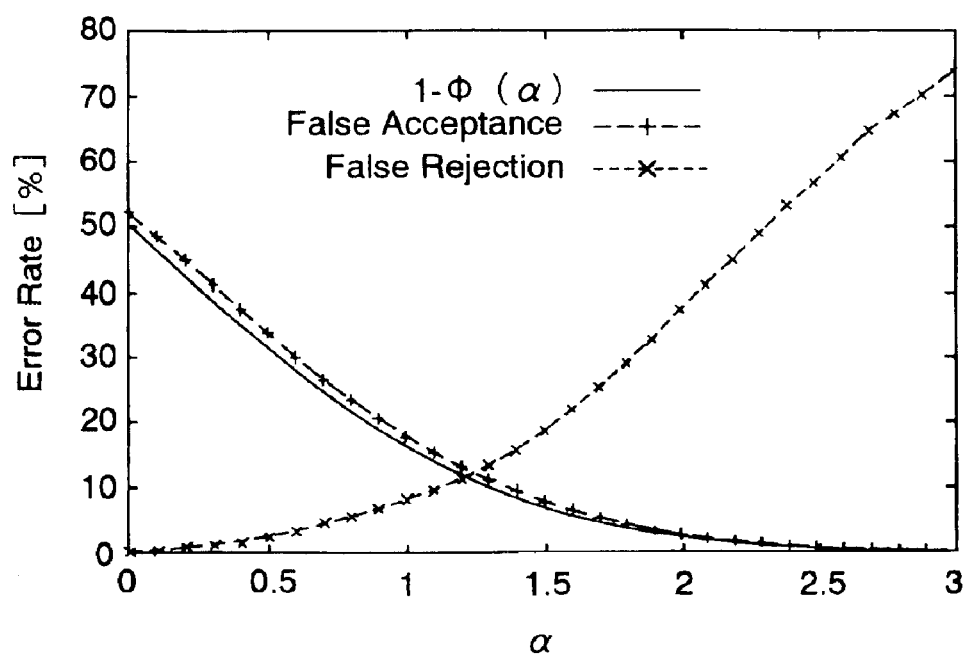
FIG. 6 is a graph showing the experimental results obtained when a speaker verification method of one example of the present invention is used under a quiet environment.

In FIG. 6, the horizontal axis indicates a obtained from the normal distribution function according to the previously designated false error rate. The solid line indicates theoretical values of the false error rate, which can be calculated as $1-\Phi(\alpha)$ using a normal distribution function $\Phi(\alpha)$ because the distribution of the speaker distances is assumed to be a normal distribution.

Furthermore, FA (false acceptance) indicates a false acceptance error rate, which is a probability of erroneously accepting an unauthorized person. FR (false rejection) indicates a false rejection error rate, which is a probability of erroneously rejecting the person specified by the ID.

In FIG. 6, the solid line shows the theoretical values of the false acceptance error rate. The short broken line shows FR obtained by experiments, and the long broken line shows FA obtained by experiments. As shown in FIG. 6, the solid line substantially matches the long broken line, which means that the experimental results of the false acceptance error rate are not significantly different from the theoretical values. Therefore, the verification accuracy of the speaker verification method of verifying the speaker based on the pre-assigned false acceptance error rate of this embodiment is expected to be high.

Figure 7:
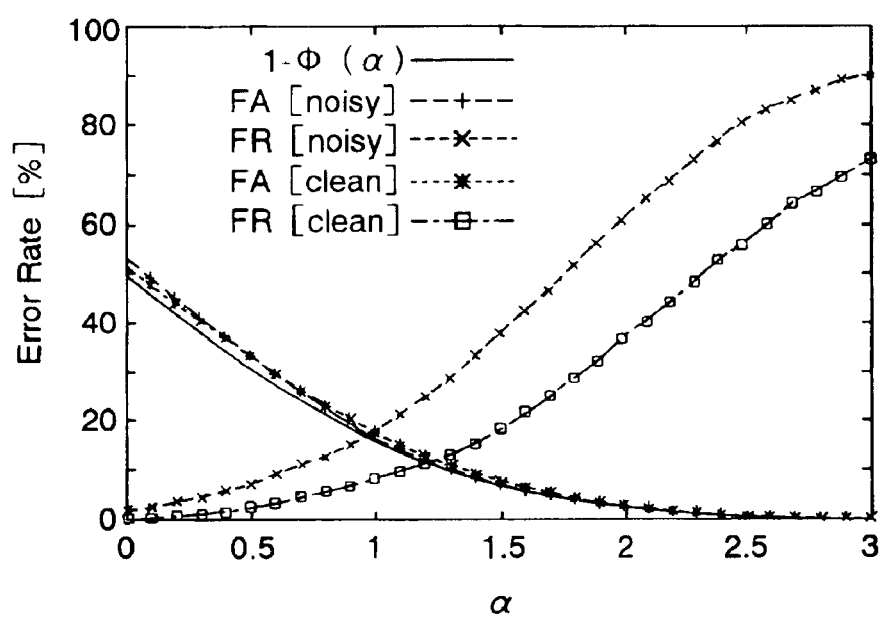
FIG. 7 is a graph showing the experimental results obtained when a speaker verification method of one example of the present invention is used under a noisy environment.

Similarly to FIG. 6, FIG. 7 shows the verification results when a white noise with a SNR (signal noise ratio) of about 20 dB is added to the voice to be verified. Herein, "a SNR of about 20 dB" refers to the level in which noise is mixed in a ratio of one noise to 10 signals. Furthermore, the solid line shows the theoretical values of the false acceptance error rate. FR (noisy) indicates a FR when a white noise is mixed. FR (clean) indicates a FR when there is no white noise. FA (noisy) indicates a FA when a white noise is mixed. FA (clean) indicates a FA when there is no white noise.

The experimental results of FIG. 7 show that with respect to FR, the white noise significantly changes the false rejection error rate, which is the probability of erroneously rejecting the person specified by the ID. On the other hand, with respect to FA, the white noise does not affect the fact that the solid line for the theoretical values of the false acceptance error rate substantially matches the experimental results regarding FA. Therefore, even if an unexpected noise is input together with the voice because the voice input environment is varied, the verification accuracy of the speaker verification method of verifying the speaker based on the pre-assigned false acceptance error rate of this embodiment is expected to be high.

Figure 8:
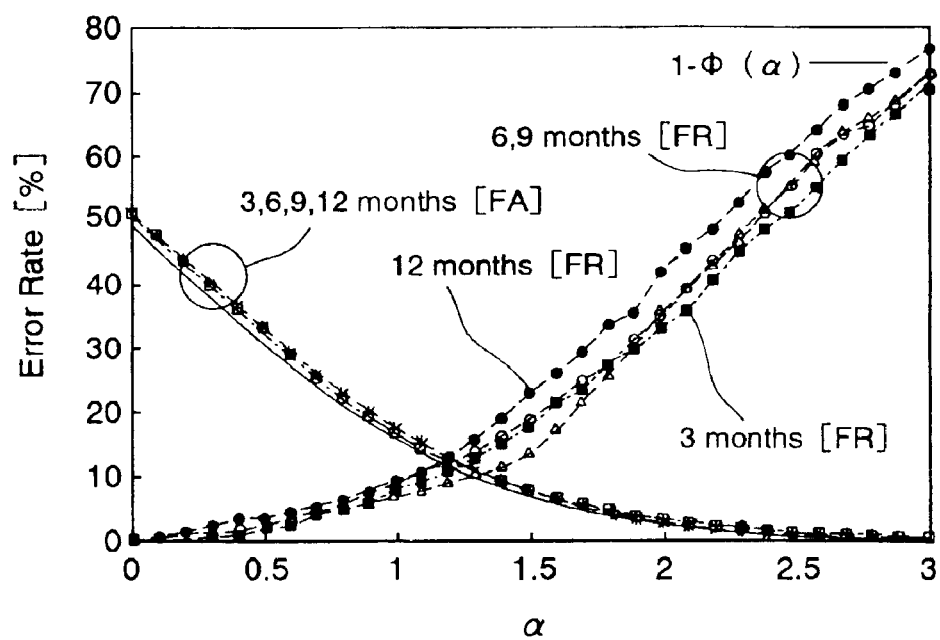
FIG. 8 is a graph showing the experimental results obtained when a speaker verification method of one example of the present invention is used for each utterance period.

Furthermore, similarly to FIG. 6, FIG. 8 shows the verification results when the time gap between the input of a voice for verification and the input of voices for registration increases by 3 months. In FIG. 8, the solid line shows the theoretical values of the false acceptance error rate, and the experimental results of FA and FR after 3, 6, 9, and 12 months have passed are shown for each of FR and FA.

The experimental results of FIG. 8 show that with respect to FR, the time gap significantly changes the false rejection error rate, which is the probability of erroneously rejecting the person specified by the ID. On the other hand, with respect to FA, the time gap does not affect the fact that the solid line for the theoretical values of the false acceptance error rate substantially matches the, broken lines indicating FA for every 3 months.

Therefore, even if the feature of the voice of the speaker has changed because of the time gap of the input of the voice, there is no significant change in the speaker distances with respect to other registered speakers. Thus, the verification accuracy of the speaker verification method of verifying the speaker based on the pre-assigned false acceptance error rate of this embodiment is maintained high. In addition, there is no need of updating the once-registered speaker templates every time the system is used, which eliminates an excessive burden on the user.

Figure 9:
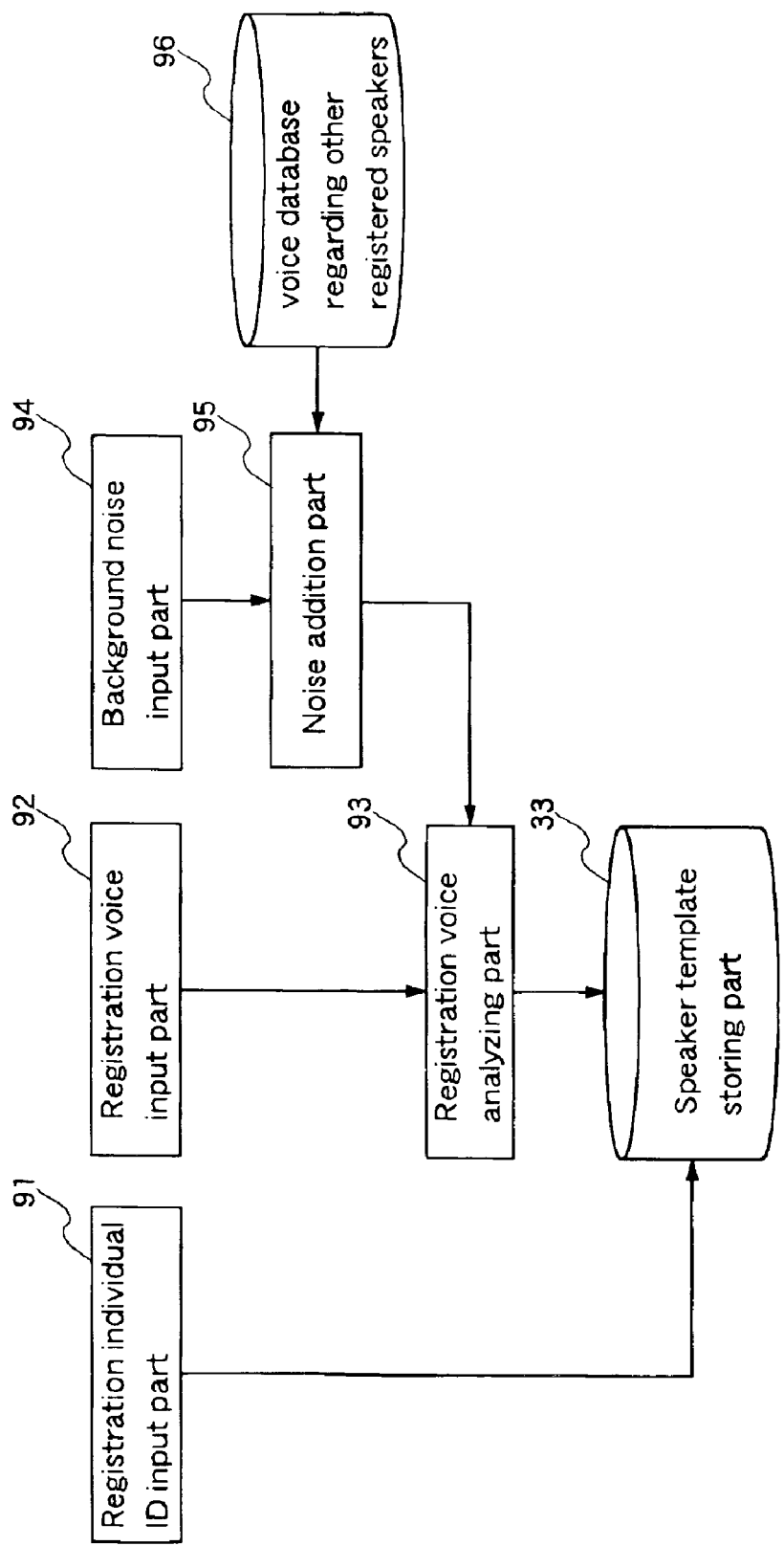
FIG. 9 is a structural block diagram of a speaker verification apparatus of one example of the present invention when registering a speaker.

Next, FIG. 9 is a block diagram of a speaker verification apparatus of one example of the present invention when registering speakers. In FIG. 9, numeral 91 denotes a registration individual ID input part. Numeral 92 denotes a registration voice input part. Numeral 93 denotes a registration voice analyzing part. Numeral 94 denotes a background noise input part. Numeral 95 denotes a noise addition part. Numeral 96 denotes a voice database regarding other registered speakers.

In FIG. 9, the individual ID of a speaker to be registered is input from the registration ID input part 91, and the voice of the speaker is input from the registration voice input part 92. The voice input from the registration voice input part 92 is converted into a feature parameter in the registration voice analyzing part 93 and is stored in the speaker template storing part 33 in linkage with the individual ID information as the voice template of the registered speaker.

Then, in order to match the input environment of the speaker to be registered to the voice database input environment of other registered speakers, background noise is input to the background noise input part 94. Then, the noise addition part 95 adds the input background noise to the voice data of the other registered speakers in the voice database 96, which have been registered beforehand. Herein, "background noise" refers to a noise that is inevitably input when a voice is input. For actual input, only a noise that accompanies no voice before or after inputting a voice is input. Then, the registration voice analyzing part 93 converts the voice data with the noise into feature parameters in the same manner as the input voice corresponding to the individual ID. Then, the speaker template storing part 33 stores the feature parameters as the voice templates of the other registered speakers at the same time when the voice template of the registered speaker is stored.

This embodiment prevents the voice input environment of other registered speakers from being significantly different from the voice input environment of the speaker to be registered. For example, even if the voice input environment of an unauthorized person is closer to the voice input environment of the registered speaker than to the voice input environment of the other registered speakers, erroneous determination that the unauthorized person is the person specified by the ID can be avoided.

In this case, the input environment is adjusted not necessarily only with respect to the voice data itself. The adjustment can be performed after the voice data are converted into a feature parameter of the voice. In addition, in the case where the voices of the other registered speakers are represented by probability models such as Hidden Markov Model, the environment can be adjusted by adapting registered speaker HMMs.

As described above, this embodiment where the speaker is verified based on the false acceptance error rate makes it possible to obtain the criterion for judging the speaker that is closer to the theoretical values of the statistical probability distribution and to maintain the false acceptance error rate closer to the theoretical values even if the voice input environment changes and a noise is mixed. Thus, the verification accuracy of the speaker verification can be maintained high without being affected by the aging of the input voice.

Figure 10:
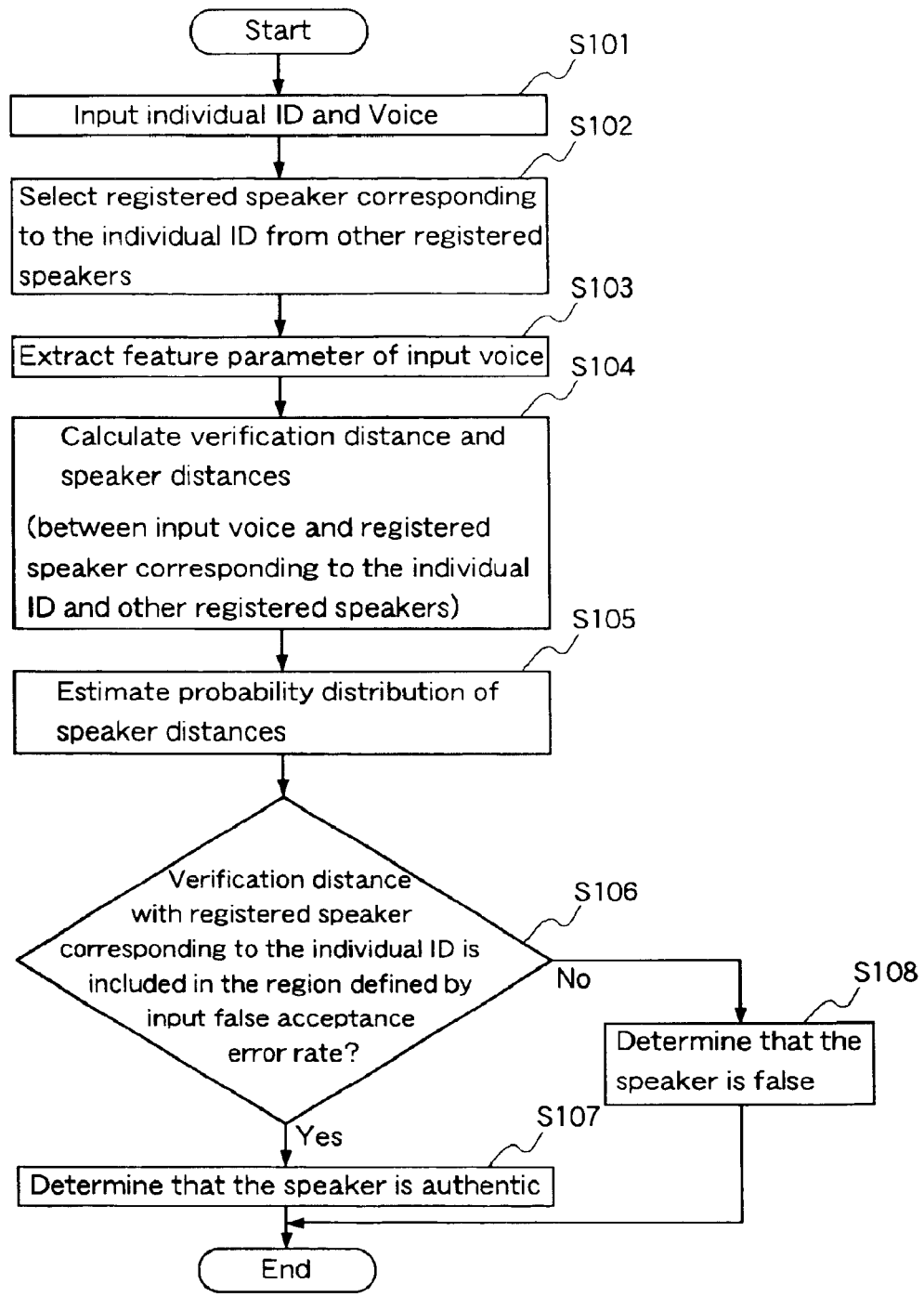
FIG. 10 is a flowchart of the processes for verifying the speaker in the speaker verification apparatus of an embodiment of the present invention.
Figure 11:
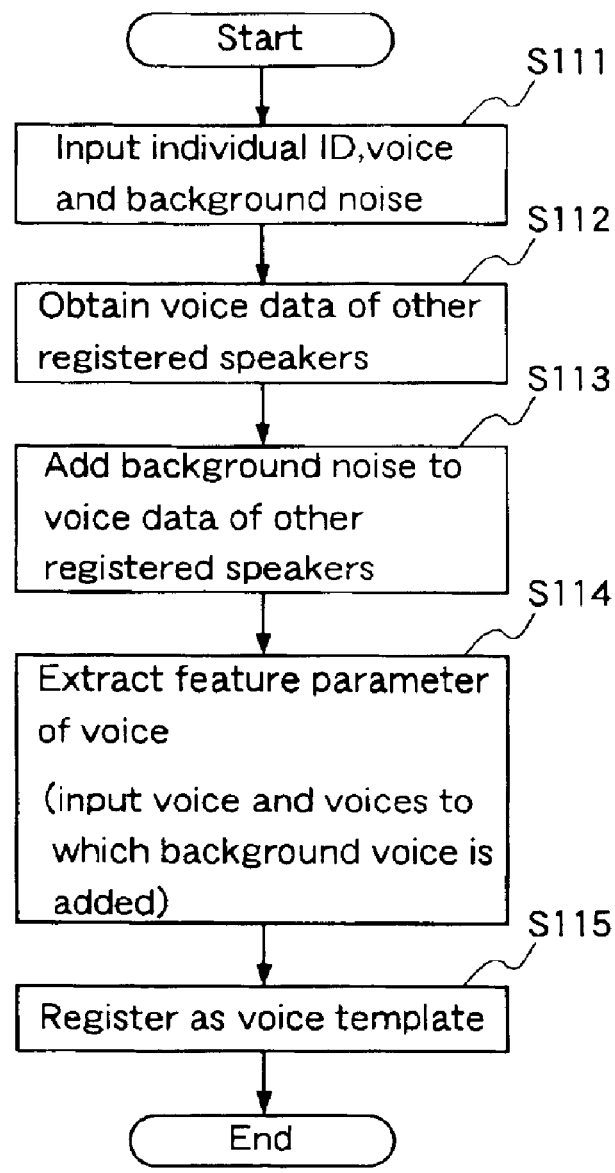
FIG. 11 is a flowchart of the processes for registering a speaker in the speaker verification apparatus of an embodiment of the present invention.

Next, the flow of processes of a program that realizes the speaker verification apparatus of an embodiment of the present invention will be described. FIGS. 10 and 11 show flowcharts of processes of a program that realizes the speaker verification apparatus of an embodiment of the present invention.

First, FIG. 10 is a flowchart of processes for verifying a speaker in the speaker verification apparatus of an embodiment of the present invention. Referring to FIG. 10, a user inputs his/her individual ID and voice and a false acceptance error rate (step S101). The false acceptance error rate generally is previously input by a system manager as a predetermined value.

Then, the registered speaker corresponding to the individual ID is selected from the other registered speakers based on the individual ID (step S102). The data of the registered speaker corresponding to the individual ID are used to obtain the verification distance to the input voice, and the data of the other registered speakers are used to obtain the probability distribution of the interspeaker distances.

Then, the feature parameter of the input voice is extracted (step S103), and the verification distance with respect to the registered speaker corresponding to the individual ID and the speaker distances with respect to the other registered speakers are calculated (step S104). The calculated results of the speaker distances with respect to the other registered speakers are used to estimate the probability distribution of the speaker distances (step S105).

When the probability distribution of the speaker distances is obtained, a region defined by the false acceptance error rate can be obtained in the probability distribution. Thus, it is determined whether or not the verification distance with respect to the registered speaker corresponding to the individual ID is included in the region (step S106). In the case where the verification distance with respect to the registered speaker corresponding to the individual ID is included in the region, the input voice is determined to be the voice of the registered person specified by the individual ID (step S107). In the case where the verification distance with respect to the registered speaker corresponding to the individual ID is not included in the region, the input voice is determined to be the voice of an unauthorized person (step S108).

Next, FIG. 11 is a flowchart of processes for registering a speaker in the speaker verification apparatus of an embodiment of the present invention. Referring to FIG. 11, a user inputs his/her individual ID and voice and background noise data (step S111).

Then, the voice data of the other registered speakers are obtained (step S112). The method of obtaining the voice data is not limited to a particular method, but it is preferable to prepare a database of the voice data regarding the other registered speakers beforehand.

Next, the input background noise is added to the obtained voice data of the other registered speakers (step S113). Thus, it is possible to minimize the difference between the environment of the input speech and that of other registered speakers beforehand in the input voice environment.

Then, feature parameters are extracted with respect to the input voice and the voice data of the other registered speakers to which the noise is added (step S114). The feature parameter of the input voice corresponding to the individual ID is stored as the speaker voice template. At the same time, the feature parameters of the voices of the other registered speakers are stored as the voice templates, which are used to calculate the speaker distances with respect to the other registered speakers (step S115).

Figure 12:
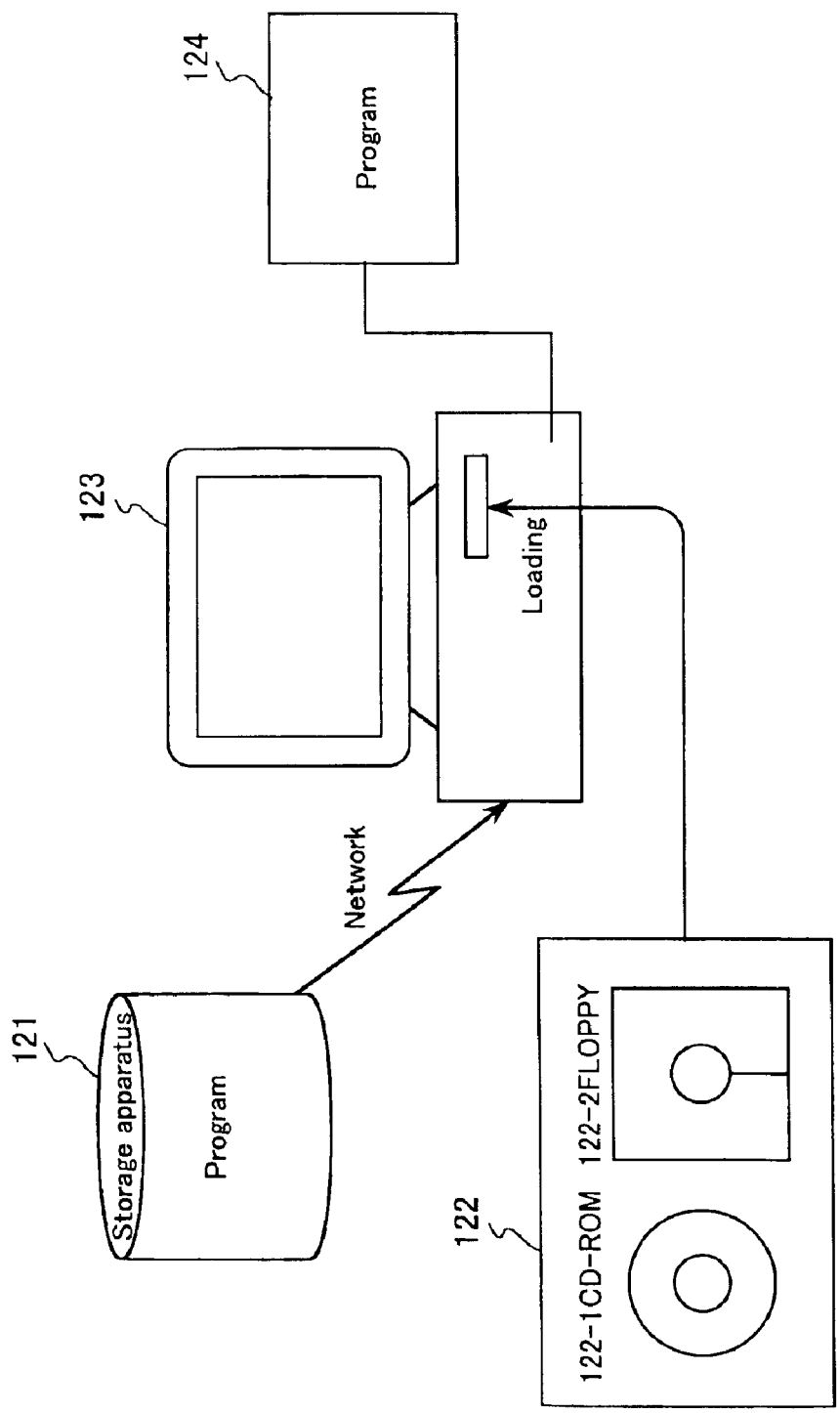
FIG. 12 is a diagram of an illustrative recording medium.

A recording medium in which programs for realizing the speaker verification apparatus of the embodiment of the present invention are recorded can be not only a transportable recording medium 122 such as a CD-ROM 122-1, or a floppy disk 122-2, but also a remote accessible storage apparatus 121 or an equipped storage medium such as a hard disk and a RAM of a computer, as shown in FIG. 12. The program 124 is loaded into the main memory of a data processing apparatus 123, and executed.

A recording medium in which the speaker templates or the like that are generated by the speaker verification apparatus of the embodiment of the present invention are recorded can be not only a transportable recording medium 122 such as a CD-ROM 122-1, or a floppy disk 122-2, but also a remote accessible storage apparatus 121 or an equipped storage medium such as a hard disk and a RAM of a computer, as shown in FIG. 12. For example, the recording medium can be read by a computer when using the speaker verification apparatus of the present invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speaker verification apparatus, comprising:

an identity claim input part to which an identity claim is input;

a speaker selecting part for selecting voice information of a registered speaker corresponding to the identity claim input to the identity claim input part;

a speaker storing part for storing voice information of speakers;

a voice input part to which a voice is input;

a voice analyzing part for analyzing the voice input to the voice input part;

a speaker distance calculating part for calculating a verification distance between a feature parameter of the input voice and that of the voice of the registered speaker and the speaker distances between a feature parameter of the input voice and those of the voices of speakers other than the registered speaker that are stored in the speaker sorting part, based on the analysis results of the voice analyzing part and the voice information stored in the speaker storing part;

a speaker judging part for determining whether or not the input voice matches the registered speaker corresponding to the input identity claim;

a false acceptance error rate input part to which a false acceptance error rate is input as a threshold, the false acceptance error rate being predetermined by a system manager or a user or being adjustable depending on performance; and a distribution estimating part for obtaining a probability distribution of interspeaker distances based on the speaker distances calculated in the speaker distance calculating part;

wherein the speaker judging part determines that the input voice is the voice of the registered person specified by the identity claim, in the case where the verification distance calculated in the speaker distance calculating part is included in a region defined by the input false acceptance error rate in the probability distribution of the interspeaker distances.

2. The speaker verification apparatus according to claim 1, wherein:

it is assumed that the probability distribution of the speaker distances is a normal distribution function; and the speaker judging part determines that the input voice is the voice of the registered person specified by the identity claim, in the case where the verification distance calculated in the speaker distance calculating part is included in a region defined by the input false acceptance error rate in the probability distribution of the speaker distances obtained from the normal distribution function.

3. The speaker verification apparatus according to claim 1, wherein:

the probability distribution of the speaker distances is obtained for each gender.

4. The speaker verification apparatus according to claim 1, wherein:

the probability distribution of the speaker distances is obtained as a weighting addition of a plurality of normal distributions.

5. The speaker verification apparatus according to claim 1, further comprising:

a voice database in which voices of other registered speakers are previously registered;

a background noise input part for inputting a background noise of an input voice;

a noise addition part for adjusting an input environment by adding the background noise input via the background noise input part to the voices of the other registered speakers stored in the voice database; and a registration voice analyzing part for converting the voices of the other registered speakers with the background noise added thereto and the input voice respectively into feature parameters, and storing the feature parameters in the speaker storing part.

6. The speaker verification apparatus according to claim 1, further comprising:

a voice database in which voices of other registered speakers are previously stored;

a background noise input part for inputting a background noise of an input voice;

a registration voice analyzing part for converting the voices of the other registered speakers and the input voice respectively into feature parameters, and storing the converted feature parameters in the speaker storing part; and a noise addition part for adjusting an input environment based on the background noise input via the background noise input part, with respect to the feature parameters obtained by the conversion from the voice of the other registered speakers.

7. A method for verifying a speaker, comprising:

inputting an identity claim;

selecting voice information of a registered speaker corresponding to the input identity claim;

inputting a voice of the speaker;

analyzing the input voice;

calculating a verification distance between a feature parameter of the input voice and that of the voice of the registered speaker and the speaker distances between a feature parameter of the input voice and those of voices of speakers other than the registered speaker, based on the analysis results and the voice; and determining whether or not the input voice matches the registered speaker corresponding to the input identity claim;

inputting a false acceptance error rate as a threshold, the false acceptance error being predetermined by a system manager or a user or adjustable depending on performance; and obtaining a probability distribution of the interspeaker distances based on the calculated speaker distances;

wherein it is determined that the input voice is the voice of the registered person specified by the identity claim, in the case where the calculated verification distance is included in a region defined by the input false acceptance error rate in the probability distribution of the interspeaker distances.

8. The speaker verification method according to claim 7, wherein:

in the determining, it is assumed that the probability distribution of the speaker distances is a normal distribution function; and the input voice is determined to be the voice of the registered person, in the case where the verification distance is included in a region defined by the false acceptance error rate in the probability distribution of the speaker distances obtained from the normal distribution function.

9. The speaker verification method according to claim 7, wherein:

the probability distribution of the speaker distances is obtained for each gender.

10. The speaker verification method according to claim 7, wherein:

the probability distribution of the speaker distances is obtained as a weighting addition of a plurality of normal distributions.

11. The speaker verification method according to claim 7, further comprising:

inputting a background noise of an input voice;

adjusting an input environment by adding the background noise to the voices of the other registered speakers previously stored in a voice database; and converting the voices of the other registered speakers with the background noise added thereto and the input voice respectively into feature parameters, and storing the feature parameters as voices of registered speakers.

12. The speaker verification method according to claim 7, further comprising:

inputting a background noise of an input voice;

converting the voices of the other registered speakers previously stored in a voice database and the input voice respectively into feature parameters; and adjusting an input environment based on the background noise with respect to the feature parameters obtained by the conversion from the voices of the other registered speakers.

13. A computer-readable recording medium storing a program to be executed by a computer, the program comprising:

inputting an identity claim;

selecting voice information of a registered speaker corresponding to the input identity claim;

inputting a voice of the speaker;

analyzing the input voice;

calculating a verification distance between a feature parameter of the input voice and that of the voice of the registered speaker and the speaker distances between a feature parameter of the input voice and those of voices of speakers other than the registered speaker, based on the analysis results and the voice; and determining whether or not the input voice matches the registered speaker corresponding to the input identity claim;

inputting a false acceptance error rate as a threshold, the false acceptance error rate being predetermined by a system manager or a user or adjustable depending on performance; and obtaining a probability distribution of the interspeaker distances based on the calculated speaker distances;

wherein it is determined that the input voice is the voice of the registered person specified by the identity claim, in the case where the calculated verification distance is included in a region defined by the input false acceptance error rate in the probability distribution of the interspeaker distances.

14. The recording medium according to claim 13, wherein:

in the determining, the program assumes that the probability distribution of the speaker distances is a normal distribution function, and determines that the input voice is the voice of the registered person, in the case where the verification distance is included in a region defined by the false acceptance error rate in the probability distribution of the speaker distances obtained from the normal distribution function.

15. The recording medium according to claim 13, wherein:

the probability distribution of the speaker distances is obtained for each gender.

16. The recording medium according to claim 13, wherein:

the probability distribution of the speaker distances is obtained as a weighting addition of a plurality of normal distributions.

17. The recording medium according to claim 13, wherein:

the program further comprises:

inputting a background noise of an input voice;

adjusting an input environment by adding the background noise to the voices of the other registered speakers previously stored in a voice database; and converting the voices of the other registered speakers with the background noise added thereto and the input voice respectively into feature parameters, and storing the feature parameters as voices of registered speakers.

18. The recording medium according to claim 13, wherein the program further comprises:

inputting a background noise of an input voice;

converting the voices of the other registered speakers previously stored in a voice database and the input voice respectively into feature parameters; and adjusting an input environment based on the background noise with respect to the feature parameters obtained by the conversion from the voice of the other registered speakers.

* * * * *

UNITED STATES PATENT AND TRADEMARK OFFICE
CERTIFICATE OF CORRECTION

PATENT NO.         : 6,879,968 B1
APPLICATION NO. : 09/487467
DATED              : April 12, 2005
INVENTOR(S)        : Shoji Hayakawa et al.

It is certified that error appears in the above-identified patent and that said Letters Patent is hereby corrected as shown below:

On the title page, Item (30), Change "Jan. 4, 1999" to --April 1, 1999--.

Signed and Sealed this

Seventeenth Day of October, 2006

JON W. DUDAS
*Director of the United States Patent and Trademark Office*